United States Patent [19]

Decker et al.

[11] 4,061,163

[45] Dec. 6, 1977

[54] METHOD OF FILLING ELECTROCHEMICAL CELLS WITH ELECTROLYTE

[75] Inventors: John J. Decker; Charles R. Ricards, both of Emporium, Pa.

[73] Assignee: GTE Sylvania Incorporated, Stamford, Conn.

[21] Appl. No.: 703,089

[22] Filed: July 6, 1976

[51] Int. Cl.² .............................................. B65B 3/04
[52] U.S. Cl. ...................................................... 141/7
[58] Field of Search ................ 53/86, 88; 141/4, 276, 141/7, 278, 8, 281, 32, 282, 51, 59, 61, 62, 65, 85, 86,115, 116, 119, 275, 276, 277, 67, 68, 148, 149, 150, 172, 194, 269, 101; 222/363

[56] References Cited

U.S. PATENT DOCUMENTS 3,911,972 10/1975 Hübers et al. ............................ 141/7

*Primary Examiner*—Houston S. Bell, Jr.
*Attorney, Agent, or Firm*—Norman J. O'Malley; William H. McNeill; Robert T. Orner

[57] ABSTRACT

Electrochemical cells containing highly reactive anodes are filled with a volatile electrolyte under controlled pressure conditions in a controllable pressure chamber. The cells are placed in the chamber with the fill port down and the chamber evacuated to a high vacuum for a given period of time. Thereafter, the pressure is increased to above the boiling point of the electrolyte being employed. A measured amount of electrolyte is then introduced to the chamber and the chamber is returned to atmospheric pressure and then raised to a pressure above atmospheric to force the electrolyte into the evacuated cell. The pressure is maintained at this level for a time sufficient to allow absorption of the electrolyte by the porous electrodes in the cell and then the excess electrolyte is blown from the chamber under pressure. Upon removal of the electrolyte the chamber is vented to the atmosphere and the cells removed and positioned with the fill ports up. The cells are now ready for final hermetic sealing.

7 Claims, 3 Drawing Figures

METHOD OF FILLING ELECTROCHEMICAL CELLS WITH ELECTROLYTE

BACKGROUND OF THE INVENTION

This invention relates to electrochemical cells and particularly to methods for filling such cells with electrolytes. Still more particularly, the invention relates to methods of filling lithium containing cells with volatile thionyl chloride.

Such cells are known in the art and comprise a metal can and cover having a terminal insulatingly mounted therethrough. The anode material is usually lithium or one of the alkali metals and the cathode can be carbon. The electrolyte can be primarily thionyl chloride containing a solute of lithium-aluminum tetrachloride.

Great care is required in assembling these cells because of the reactivity of the components, particularly the lithium and the thyionyl chloride.

It has been suggested in the past to fill the cells under vacuum conditions; that is, the metal can and cover are partially sealed, leaving a small opening as a fill port. The cells were placed in a vacuum chamber and a high vacuum drawn thereon, this vacuum being below the boiling point of the electrolyte. Electrolyte was then introduced into the chamber in an amount to cover the cell, and then the chamber was returned to atmospheric pressure. Excess electrolyte was then sucked from the chamber into a reservoir and the cells removed.

This procedure lacked consistency and frequently damaged the cells. Often, the cover and terminal contained therein were covered by the electrolyte. Further, the electrolyte was introduced into the chamber under a high vacuum (30" Hg) causing the electrolyte to boil and spatter the cells.

OBJECTS AND SUMMARY OF THE INVENTION

Therefore, it is an object of this invention to obviate the disadvantages of the prior art.

It is another object of the invention to enhance battery filling techniques.

It is a further object of the invention to provide a method of filling batteries which is consistent and controllable.

These objects are accomplished in one aspect of the invention by a method of filling electrochemical cells containing a fill port which comprises placing the cells in a controllable pressure chamber with the fill ports down. The chamber is then evacuated to a first pressure which is below the boiling point of the electrolyte. The pressure is then increased to a second pressure which is above the boiling point of the electrolyte. A sufficient amount of electrolyte is then introduced in the chamber to cover the fill ports of the cells. The pressure is then increased to atmospheric and then increased again to greater than atmospheric. The remaining electrolyte is then blown from the chamber, the chamber is vented to atmosphere and the cells removed.

This carefully controlled procedure greatly increases the efficiency with which the cells are filled. The controlled amount of electrolyte introduced insures that only the fill port area of the cell is covered, thus avoiding contamination of the remainder of the cell container. This contamination is further reduced by increasing the pressure to above the boiling point of the electrolyte before the electrolyte is introduced into the chamber, thus reducing contamination caused by spattering.

DESCRIPTION OF THE PREFERRED EMBODIMENTS

For a better understanding of the present invention, together with other and further objects, advantages, and capabilities thereof, reference is made to the following disclosure and appended claims taken in conjunction with the above-described drawings.

Figure 1:
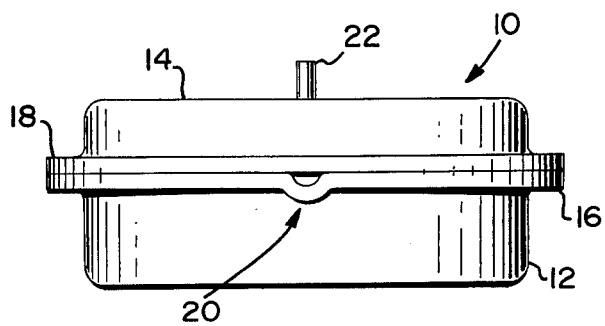
FIG. 1 is an elevational view of a cell that can be filled by the hereindescribed process.

Referring now to the drawings with greater particularity there is shown in FIG. 1 an electrochemical cell 10 comprising a can 12 and a cover 14 sealed together at a flange 16 on can 12 and a flange 18 on cover 14. The cell contains within it suitable positive and negative electrodes, not shown. A small unsealed area is left between the flanges to provide a fill port 20. The can and cover are formed from a suitable electrically conductive material to provide one terminal for the cell and a second terminal 22 is provided extending through the cover and electrically insulated therefrom, as by a glass to metal seal 24 (see FIG. 2).

Figure 2:
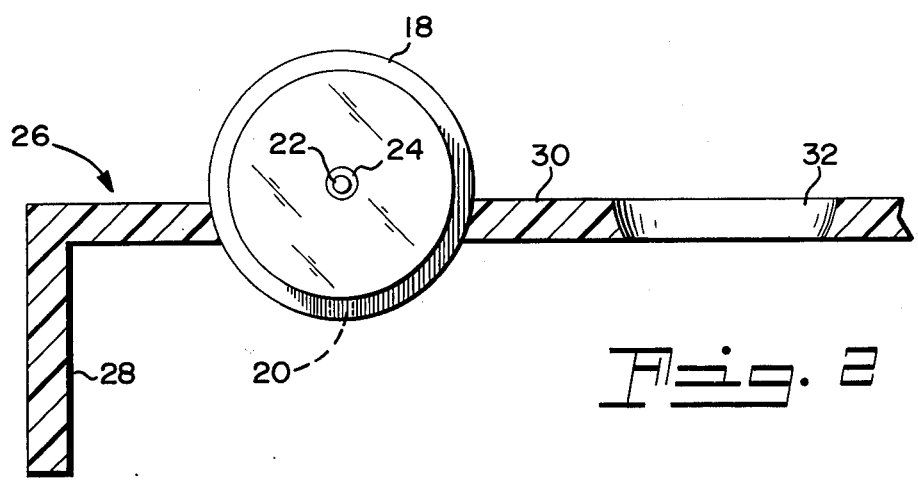
FIG. 2 is an elevational, diagrammatic, sectional view of a cell holding rack.

When the cells 10 are to be filled with electrolyte, one or more of the cells are mounted in a rack such as rack 26, shown diagrammatically in FIG. 2. Rack 26 has legs 28 and a horizontal traying portion 30 extending therebetween provided with a plurality of cell receiving apertures 32. The cell receiving apertures 32 are of a sufficient size to maintain the cells 10 therein. Rack 26 is formed from a suitable material which is substantially non-reactive with the electrolyte being employed. For most electrolytes, a suitable material is polytetrafluoroethylene.

Figure 3:
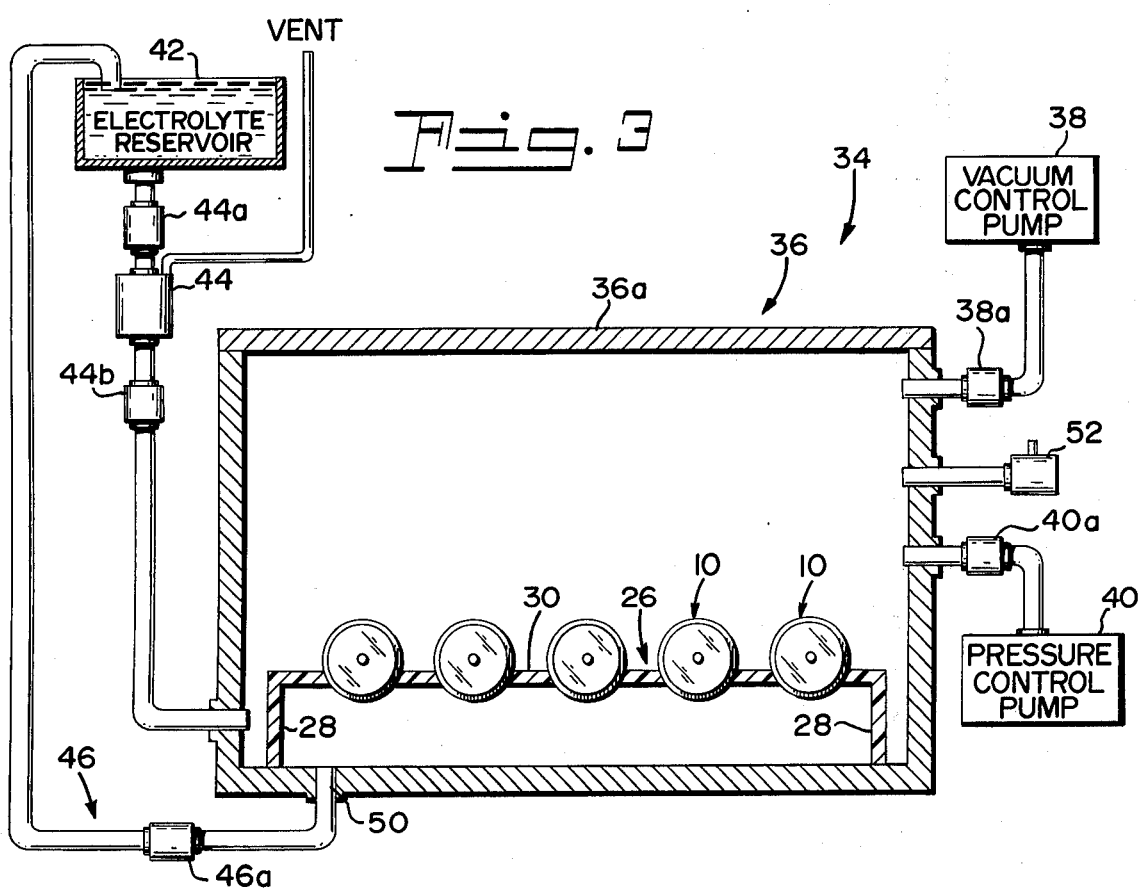
FIG. 3 is a diagrammatic view of a controllable pressure chamber and system.

The filling apparatus is shown diagrammatically, and by way of example only, in FIG. 3. Herein, the apparatus 34 comprises a hermetically sealable, controllable pressure chamber 36; vacuum means 38; pressure increasing means 40; and electrolyte reservoir 42; electrolyte fill means 44; and electrolyte removal means 46.

To fill the cells 10 with electrolyte, one or more of the cells are placed in rack 26 with the fill port 20 downwardly oriented. The rack 26 is then placed in controllable pressure chamber 36 and a cover 36a therefore is suitably locked in position by means not shown. The chamber 36 is then evacuated to a high vacuum, about 30" Hg, for a controlled period of time, by vacuum control pump 38 and valve 38a. The length of time will vary with the size of the chamber, the capability of the vacuum pump and the number of cells, but should be of sufficient length to remove substantially all water and water vapor from the cells and chamber.

After the sufficient period of time (about 5 minutes for a unit containing about 300 button cells) the vacuum is lessened by increasing the pressure in the chamber 36 to above the boiling point of the electrolyte to be used. When the cell 10 employs lithium as the anode and the electrolyte being used is thionyl chloride the vacuum pressure should be about 27" Hg. The pressure increase can be accomplished by opening valve 40a which leads to pressure control pump 40 and dispensing into chamber 36 a necessary amount of a dry and inert gas. While dry air can be used, nitrogen or argon or a similar dry and inert gas is preferred.

With the vacuum pressure stabilized at the desired level above the boiling point of the electrolyte, a specific amount of electrolyte is dispensed into the bottom of the chamber 36. This specific amount is that necessary to cover the fill port 20 of the cells 10. The electrolyte is preferably maintained in a reservoir 42 positioned above chamber 36. A metering tank 44 containing the desired amount of electrolyte is positioned between reservoir 42 and chamber 36 and is controlled by a fill valve 44a and an empty valve 44b. With metering tank 44 filled, fill valve 44a is closed and empty valve 44b is opened, thus dispensing a measured amount of electrolyte into chember 36. Empty valve 44b is then closed and fill valve 44a opened to ready metering tank 44 for the next cycle. Metering tank 44 is vented to atmosphere at all times somewhere above the level of electrolyte in the reservoir 42.

Valve 40a is then opened and a dry gas emitted into chamber 36 to raise the internal pressure to atmosphere and then additional dry gas emitted to raise the temperature to some consistant positive pressure above atmospheric (e.g., 15 to 20 psi) for a controlled period of time. Since the cells begin filling as the pressure increases, the controlled period of time is that necessary to insure filling of the cells and absorbtion of the electrolyte by the electrodes. For the number of cells described above, this time should be of the order of 5 to 10 minutes.

After filling has been accomplished, valve 46a in the electrolyte removal means 46 is opened and the remaining electrolyte blown, under pressure, from the chamber 36 through drain 50 and removal means 46 to reservoir 42.

With the electrolyte removed vent 52 is opened and the chamber 36 vented to atmosphere. Naturally, at this time, all other valves, namely 38a, 40a, 44a, 44b, and 46a are closed.

The cells are then removed from chamber 36 and positioned with fill ports 20 upwardly oriented to prevent electrolyte leakage to await final sealing.

It will be seen from the above that there is herein provided a unique and highly controllable method of filling electrochemical cells. Cell contamination is reduced because electrolyte spattering and excess electrolyte are controlled. The electrolyte is actually sucked up into the cell as the chamber is brought to atmospheric pressure. And, the additional positive pressure applied insures that the electrolyte is driven into the cell and aids the internal electrodes to absorb the same.

Blowing the excess electrolyte from the chamber under pressure reduces the possibility of sucking electrolyte back out of the cells during drainage, as was the case with the prior art techniques.

While there have been herein described what are at present considered to be the preferred embodiments of the invention, it will be apparent to those skilled in the art that various changes and modifications can be made herein without departing from the scope of the invention as defined by the appended claims.

WHAT IS CLAIMED IS:

1. In a method of filling electrochemical cells with liquid electrolyte, said cells being comprised of positive and negative elements contained within a cell body which is provided with a fill port, the steps comprising: placing at least one of said cells in a controllable pressure chamber with said fill port down; evacuating said chamber to a first vacuum pressure below the boiling point of said liquid electrolyte for a first given period of time; increasing the pressure in said chamber to a second vacuum pressure above the boiling point of said electrolyte but below atmospheric; introducing a sufficient amount of electrolyte into said chamber to cover said fill port; increasing the pressure in said chamber to atmospheric; increasing the pressure to greater than atmospheric for a second given period of time; removing said remaining electrolyte by blowing from said chamber; venting said chamber to atmosphere; and removing said at least one cell.

2. The method of claim 1 wherein said first vacuum pressure is about 30" of mercury.

3. The method of claim 2 wherein said second vacuum pressure is about 27" of mercury.

4. The method of claim 1 wherein said pressure increases are accomplished by the introduction into said pressure chamber of a dry gas.

5. The method of claim 2 wherein said first given period of time is sufficient to allow substantial removal of water from said chamber and said at least one cell.

6. The method of claim 5 wherein said second given period of time is sufficient to allow for electrolyte absorbtion by said at least one cell.

7. The method of claim 1 wherein said electrolyte is thionyl chloride.

* * * * *